Aug. 11, 1959   H. O. MOORE   2,899,518
TIME DELAY APPARATUS
Filed Nov. 22, 1957   2 Sheets-Sheet 1
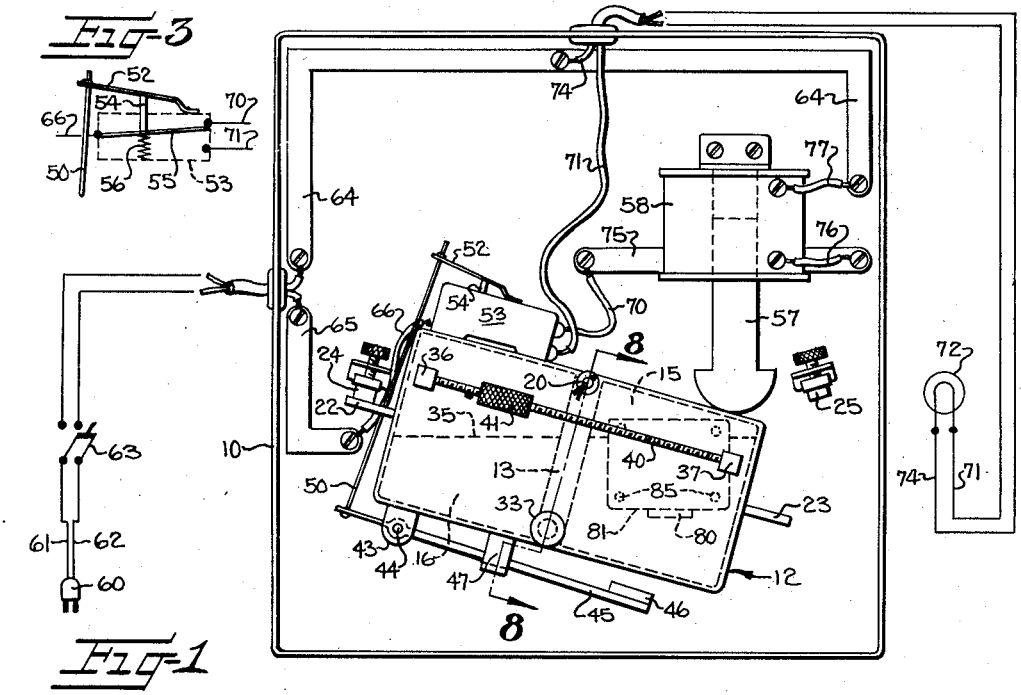
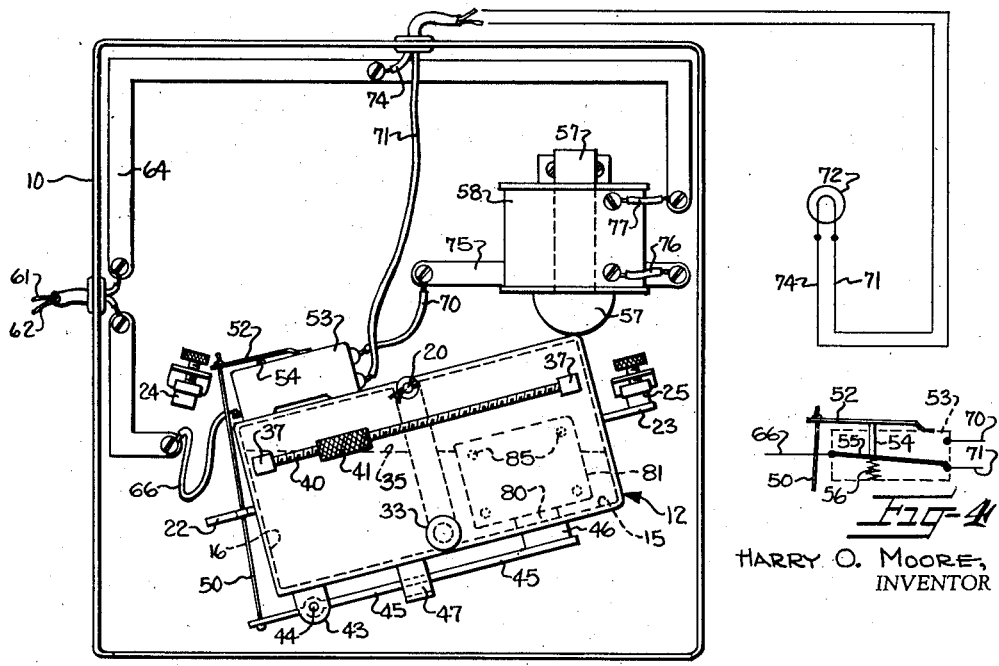
HARRY O. MOORE,
INVENTOR
BY Eaton, Bell, Hunt & Seltzer
ATTORNEYS

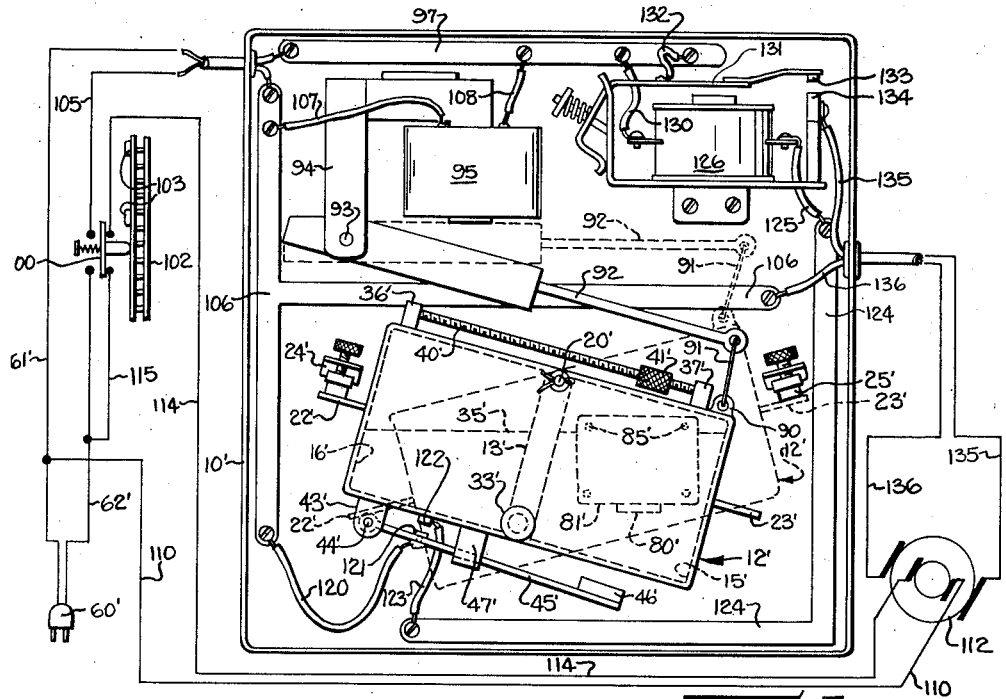

United States Patent Office 2,899,518
Patented Aug. 11, 1959

2,899,518

TIME DELAY APPARATUS

Harry O. Moore, Charlotte, N.C.

Application November 22, 1957, Serial No. 698,209

6 Claims. (Cl. 200—84)

This invention relates to a novel time delay apparatus particularly adapted to delay the operation of an electrical device for a predetermined time following the activation of the apparatus and/or prolong the operation of an electrical device for a predetermined time following the deactivation of the apparatus. The time delay apparatus is particularly useful in the operation of electric motors, lights, sirens or the like. The novel time delay apparatus of the present invention may also be easily adapted for use in the intermittent operation of an electrical device where it is desired to operate the device for a predetermined time and to have the device inoperative for a predetermined time.

Heretofore, most types of time delay apparatuses available have been complicated, expensive and, due to wear of various parts, not reliable enough to give uniform timing for a prolonged period. One type is the popular pneumatic timing relay which employs the use of air chambers and flexible diaphragms to vary the size of the air chambers and the time cycle is determined by the speed the air is exhausted and returned in the air chambers. The diaphragms have to be formed of some type of resilient material, such as rubber, which as well known, will wear and become brittle with use and age to thereby reduce its effectiveness over a period of time. Most other types of time delay apparatuses currently available are also similarly affected by age and wear of the parts.

It is an object of this invention to provide a time delay apparatus which may be economically manufactured, easily adjusted and reliable in operation over long periods of time.

It is another object of this invention to provide a time delay apparatus which has a large range of adjustment of the timing cycle to thereby provide easy adaptability of the time delaying apparatus to a large variety of applications.

It is a more specific object of this invention to provide a time delay apparatus which utilizes a compartmented float chamber partially filled with a liquid and means to oscillate or tip the float chamber so that the liquid will flow from one chamber to the other and vary the position of a float in one of the compartments. The float is provided with magnetic means to actuate an electric switch means carried by the float chamber, depending upon the relative position of the liquid level and float in the chamber, to thus provide a time delaying apparatus not subject to changes in the operating time period due to wear or deterioration of the parts because of age.

Some of the objects of the invention having been stated, other objects will appear as the description proceeds when taken in connection with the accompanying drawings, in which—

Figure 1 is a front elevation of the time delay apparatus, showing the same positioned in a suitable housing with the cover removed therefrom and illustrating schematically the manner in which the apparatus may be utilized in the intermittent operation of an electric light bulb;

Figure 2 is a view similar to Figure 1 except showing some of the parts in different position;

Figure 3 is a schematic diagram showing the position of the electric switch when the float is positioned as shown in Figure 1;

Figure 4 is a schematic diagram showing the position of the electric switch when the float is positioned as shown in Figure 2;

Figure 5 is a front elevation of the housing containing a modified form of time delay apparatus and showing the apparatus actuated by a pattern control mechanism to delay the control of a two speed electric motor shown connected thereto;

Figure 6 is a sectional plan view of the float chamber of the time delay apparatus shown in Figure 5;

Figure 7 is a sectional bottom plan view of the float chamber shown in Figure 5;

Figure 8 is a vertical sectional view through the float chamber and being taken substantially along the line 8—8 in Figure 1.

Referring to the drawings, and in particular to the first form shown in Figures 1 through 4 and 8, a housing or box 10 is provided and may be attached to a wall, machine frame or the like for supporting the time delay apparatus and to prevent accumulations of lint, moisture and the like on the apparatus. The box 10 contains a float chamber 12 which is substantially rectangular and formed of a non-magnetic material such as plastic. The chamber 12 is provided with a vertical center wall 13 to divide the chamber 12 into two separate compartments indicated at 15 and 16. The float chamber 12 is oscillatably mounted on the forward portion of a shaft or support 20, the rear end of which is suitably secured in the rear wall of the box 10.

Opposite ends of the float chamber 12 are provided with outwardly extending fixed stop members 22 and 23 which are adapted to at times engage respective adjustable stops 24 and 25 suitably mounted on the rear wall of the box 10. The stop members 22 and 23 serve to limit oscillation of the float chamber 12 as it is alternately moved from the position shown in Figure 1 to the position shown in Figure 2 and back again, in a manner to be later described. The lower portion of the partition or wall 13 is provided with a passageway or opening 30 which communicates with the chambers or compartments 15 and 16 and an opening or passageway 32 at the upper edge of the wall 13 which also communicates with the compartments 15 and 16. The size of the passageway or opening 30 in the wall 13 may be varied by adjustment means in the form of an adjustment screw 33 (Figures 1, 2 and 8) threadably embedded in the wall 13 and the inner end of which may be positioned to close any desired portion of the opening 30.

The compartments 15 and 16 are partially filled with a suitable liquid, such as water or oil indicated at 35 and the rate of flow of the liquid from one compartment to the other through the passageway 33 as the chamber 12 is tilted may be varied by adjustment of the screw 33, for purposes to be later described. The front wall of the float chamber 12 is provided with a pair of outwardly projecting members 36 and 37 which fixedly support opposite ends of a threaded shaft 40. The threaded shaft 40 has a weight member 41 threaded thereon and adjustable longitudinally of the float chamber 12 by rotation on the shaft 40.

The lower wall of the float chamber 12 is provided with a pair of downwardly depending support arms 43 in which opposite ends of a pivot pin 44 are suitably secured. The pivot pin 44 supports the medial portion of a switch actuating arm 45 spaced below and extending longitudinally below the float chamber 12. One end of the switch actuating arm 45 terminates beneath the compartment 15 and is provided with a permanent magnet 46 fixed thereto. The medial portion of the switch actuating arm 45 is guided and limited in its downward movement by a substantially U-shaped bracket 47, the upper ends of the legs thereof are suitably secured to or formed integral with the bottom of float chamber 12.

The left-hand end of the actuating arm 45 is connected to the lower end of a control wire 50 which extends upwardly through the stop member 23 and is suitably secured to one end of a switch lever 52. The other end of the switch lever 52 is suitably secured on the top surface of a conventional electric switch housing 53. The switch housing 53 is fixed on the top of the chamber 12 and has a switch plunger 54 connected to a selector switch blade 55. The blade 55 (Figures 3 and 4) is moved from the position shown in Figure 3 to the position shown in Figure 4 when the switch lever 52 is lowered by the wire 50 and is moved from the position shown in Figure 4 to the position shown in Figure 3 by a spring 56 in the switch housing 53 when the wire 50 is raised.

Since the float chamber 12 has the switch housing 53 mounted above the compartment 16 and the balancing weight member 41 is disposed over the compartment 16, this end of float chamber 12 is heavier than the other end and the chamber 12 will normally move by gravity to the position shown in Figure 2. The float chamber 12 is at times moved or tilted to the position shown in Figure 1 by the weight of a solenoid plunger 57, the upper end of which is mounted for vertical movement in a solenoid coil 58 suitably supported on the rear wall of the box 10.

The coil 58 is interposed in an electrical circuit which includes a suitable male plug 60 adapted to be connected to any suitable source of electrical energy, not shown, and main lead wires 61 and 62 connected at one end to the plug 60. The main lead wires 61 and 62 have a manually operable switch 63 interposed therein and the ends of the wires 61 and 62 opposite the plug 60 are suitably connected to respective connectors 64 and 65 suitably mounted in and insulated from the box 10. The connector 65 has one end of a wire 66 connected thereto and the opposite end of which is suitably connected to one side of the switch blade 55 (Figures 3 and 4). The switch blade 55 is adapted to selectively connect the wire 66 with a wire 70 or a wire 71, one end of each of which is connected to the side of the switch 53 opposite the wire 66. The other end of the wire 71 extends to and is suitably connected to one side of an electrical consuming device, such as an electric light bulb 72.

The other side of the bulb 72 has one end of an electric wire 74 connected thereto and the other end of which is suitably connected intermediate the ends of the connector 64 which in turn is connected to the main lead wire 61. The end of the wire 70 opposite the switch 53 is connected to one end of a connector 75 fixed on and insulated from the box or housing 10. The other end of the connector 75 has one end of a wire 76 connected thereto and the other end of which is connected to one side of the coil 58. The opposite side of the coil 58 has one end of a wire 77 connected thereto and the opposite end of which is connected to the end of the connector 64.

Thus, when the switch blade 55 is moved to the position shown in Figure 4, by means to be presently described, the electrical circuit will be completed through the main lead wire 62, the connector 65, wire 66, switch 53, wire 71, light bulb 72, wire 74, connector 64, and main lead wire 61 to thus complete the circuit to the light bulb and energize the same until the switch blade 55 is moved from the position shown in Figure 4. When the switch element 55 is moved from the position shown in Figure 4 to the position shown in Figure 3, the electrical circuit will be completed through the main lead wire 62, the connector 65, wire 66, switch 53, wire 70, connector 75, wire 76, coil 58, wire 77, connector 64, and to the main lead wire 61 to thus complete the electrical circuit to the solenoid coil 58 and cause the plunger 57 mounted therein to be raised from the position shown in Figure 1 to the position shown in Figure 2. It can thus be said that when the switch lever 52 is in a raised position, the switch blade 55 will complete an electrical circuit to the solenoid coil 58 and raise the plunger 57 and when the switch lever 52 is lowered, the switch blade 55 will complete an electrical circuit to the electrical device or light bulb 72.

Movement of the switch lever 52 from the position shown in Figure 3 to the position shown in Figure 4 and back is effected by vertical movement of the wire 50 which is controlled by the switch actuating arm 45. The position of the switch actuating arm 45 is in turn controlled by the position of a permanent magnet 80 suitably secured to the lower end of a float 81 positioned in the compartment 15 of the float chamber 12. Of course, the position of the float 81 is determined by the liquid level in the compartment 15, the tilting of the chamber 12 and the rate of speed that the liquid can pass through the passageway 30. Guide pins or projections 85 may be provided on the float 81 to prevent the sides of the float from sticking to the sides of the compartment 15 during vertical movement of the float 81 therein. Of course, projections or ribs may be formed on the inside surfaces of the compartment 15 in lieu of the projections 85 to accomplish the same result.

In Figure 1 the solenoid plunger 57 has tilted the chamber 12 and liquid passed from the compartment 16 into the compartment 15 so that the float 81 and the magnet 80 have been raised sufficiently to release the influence of magnet 80 on the magnet 46. The right-hand end of the switch actuating arm 45 is then lowered to raise the wire 50, move the switch lever 52 upwardly and switch the right-hand end of the blade 55 in the switch 53 to make an electrical connection between the wire 66 and wire 70. This will then complete the circuit to the coil 58 and raise the solenoid plunger 57 to the position shown in Figure 2. The float chamber 12 will then tilt or oscillate by gravity from the position shown in Figure 1 to the position shown in Figure 2.

Of course, when the chamber 12 is first moved from the position shown in Figure 1 to the position shown in Figure 2, the float 81 will remain in a high position in the chamber 15 since the liquid level therein will remain high. However, the liquid level in the chamber 15 will begin to lower and the liquid level in the chamber 16 will begin to raise as the two levels in the different chambers 15 and 16 level themselves by the passage of liquid from the chamber 15 through the port or passageway 30 and into the chamber 16. The length of time it takes for the two liquid levels to equalize to substantially the position shown in Figure 2 will depend upon the rate of flow of liquid through the passageway 30 and the rate of flow may be adjusted by rotation of the threaded screw 33 as desired. As the level of liquid in the chamber 15 is lowered, the float 81 will be lowered and when the magnet 80 carried by the float 81 is sufficiently close to the magnet 46 on the right-hand end of the switch actuating arm 45, the right-hand end of the arm 45 will be drawn upwardly against the bottom of the chamber 12, move the wire 50 and switch lever 52 downwardly and switch the switch blade 55 from the position shown in Figure 3 to the position shown in Figure 4.

With the switch blade 55 moved to the position shown in Figure 4, the electrical circuit will be completed to the electric light bulb 72 to turn the same on. When the electrical circuit is completed to the bulb 72 it will be broken to the solenoid coil 58 to release the solenoid plunger 57 and move the float chamber 12 from the position shown in Figure 2 to the position shown in Figure 1. The magnet 80 will continue to hold the magnet 46 against the bottom of the chamber 12 however and keep the light on for a predetermined time until the liquid level in the compartment is high enough to overcome the attraction between the magnets 80 and 46 and lift the float 81. The time required for the liquid level in the compartment 15 to raise may be varied by adjustment of the threaded screw 33 to either increase or decrease the size of the passageway 30 in the wall 13.

When the liquid level in the chamber 15 has reached a sufficient height to overcome the force of the magnets 80 and 46, the float 81 will immediately rise and the switch actuating arm 45 will be released to move to the position shown in Figure 1 and move the switch blade 55 to the position shown in Figure 3 to complete the circuit between the wires 66 and 70. Then the solenoid coil 58 will be energized, the light bulb 72 turned off and the float chamber, due to its overweighted left-hand end, moved from the position shown in Figure 1 to the position shown in Figure 2 and start another cycle of operation.

It is thus seen that the switch 53 is alternately moved from the position shown in Figure 3 to the position shown in Figure 4 and vice versa and remains in each position for predetermined periods of time so that the light bulb 72 will remain on for a predetermined length of time and then will remain off for a like period of time to thus automatically blink the light in predetermined cycles. The length of time that the light stays on and stays off will, of course, depend upon the rate of flow of the liquid from one chamber to the other through the passageway 30.

Referring to Figures 5 through 7, there is shown a modified form of time delay unit which is particularly adapted for use as a control for a two-speed motor to provide a time delay or lag in operation between the time that the motor is switched from a high speed to a slow speed. Since many of the parts shown in the modified form in Figures 5 through 7 are identical to the parts shown in Figures 1 through 4 and 8, like parts will bear like reference characters with the prime notation added.

In this case, the float chamber 12' is identical to the float chamber 12 but the switch actuating arm 45' does not extend beyond the pivot shaft 44' as was the case in the first form and the balancing weight member 41' has been moved from the front side of the float chamber 12' to the top surface thereof (Figure 5). A different float tilting means is employed and includes a connector 90 fixed on one end and projecting upwardly from the upper surface of the float chamber 12' which pivotally supports the lower end of a connecting link 91. The upper end of the link 91 is suitably connected to the right-hand end of a lifting lever 92 oscillatably mounted as at 93 on one leg of a magnetic core member 94 supported on the rear wall of the box 10'. The other leg of the core 94 supports an electrical coil 95, which, when energized, makes an electromagnet out of the leg of the mount 94 which it surrounds to draw the lever 92 upwardly to the dotted line position shown.

The electrical circuit of the modified form of delaying apparatus includes a male plug 60' which may be suitably connected to any source of electrical energy, not shown, and main lead wires 61' and 62' connected thereto. The opposite end of the wire 61' is suitably connected to a connector bar 97 suitably secured to and insulated from the box 10'. The other end of the wire 62' is suitably connected to one side of a double acting switch 100 normally resiliently urged to the position shown in Figure 5 by spring means integral therewith so that the plunger thereof normally rides in close proximity to one side of a pattern chain 102 having actuating lugs 103 spaced therealong. The other side of the switch 100 has one end of a wire 105 connected thereto and the other end of which is connected to one end of a T-shaped connector bar 106 suitably secured to and insulated from the box 10'.

One end of a wire 107 is connected to the connector bar 106 and the other end to one side of the coil 95. One end of a wire 108 is connected to the other side of the coil 95 and its other end is connected to the connector bar 97. One end of a wire 110 is connected intermediate the ends of the main lead wire 61' and the other end thereof is connected to one side of the fast speed circuit of an electric motor 112. The other side of the fast speed circuit of the electric motor 112 has one end of a wire 114 connected thereto and the opposite end of which is connected to one side of the switch 100. The opposite side of the switch 100 has one end of a wire 115 connected thereto and the opposite end of which is connected intermediate the ends of the main lead wire 62'.

Thus, with the parts positioned as shown in Figure 5, an electrical circuit will be completed through the lead wire 62', wire 115, switch 100, wire 114, fast speed circuit of the electric motor 112, wire 110, and wire 61' to drive the electric motor 112 at a fast rate of speed as long as this condition is maintained.

The electrical circuit of the modified form also includes a wire 120, one end of which is connected to the contact bar 106 and the opposite end of which is connected to a contact point 121 mounted in and insulated from the switch actuating arm 45'. The contact point 121 is adapted to at times engage and complete a circuit to a contact point 122 carried by the float chamber 12' and which has one end of a wire 123 connected thereto, the opposite end of which is connected to a connector 124. The connector 124 has one end of a wire 125 connected thereto and the opposite end of which is connected to one side of the coil 126 of an electromagnet suitably secured to and insulated from the rear wall of the housing or box 10'. The opposite side of the electromagnet coil 126 has one end of a wire 130 connected thereto and the opposite end of which is connected to the connector 97.

The electromagnet has a switch arm 131 positioned above the coil 126 which is normally raised to the position shown in Figure 5 by conventional spring means at times is moved to a lowered or closed position by energization of the coil 126, in a manner to be later described. A wire 132 is connected at one end to the connector 97 and at its other end to the switch arm 131 and the switch arm 131 has a contact point 133 fixed on its outer end which is adapted to at times engage a contact point 134. The contact point 134 has one end of a wire 135 connected thereto and the opposite end of which is connected to one side of the slow speed circuit of the electric motor 112. The opposite side of the slow speed circuit of the electric motor 112 has one end of a wire 136 connected thereto and the opposite end of which is connected to the connector plate 106.

As heretofore stated, this particular modified form is adapted for use with an electric circuit for a two-speed motor and is of particular value where the two-speed motor is driving mating gears on heavy machinery, such as a circular knitting machine which changes speed during knitting. When changing the speed of the motor 112 from a slow to a fast speed, the gearing is not affected since there is no back-lash between the gear teeth when the speed of the machine is increased but at certain times during the knitting, it is desirable to slow the knitting machine down, such as during the patterned area, and when this is done suddenly, there is back-lash between the gear teeth and danger of breaking the teeth in the gears. If the motor is switched immediately from fast to slow speed the motor will try to immediately slow the whole knitting machine down from approximately 1800 revolutions per minute to approximately 900 revolutions per minute. This, of course, causes a back-lash or reversal of the gearing mechanism in the knitting machine since the knitting machine traveling at a high rate of speed has built up quite a momentum and therefore very often results in broken gear teeth and damage to the motor due to the braking action thereon, as the momentum of the machine is slowed down.

As long as the switch 100 remains in the position shown, the motor 112 will continue to drive the knitting machine at a fast rate of speed and the pattern chain 102, which is a part of the knitting machine, will progressively move in accordance with the speed of the knitting machine. In its progress, a lug 103 on the chain 102 will engage and depress the plunger of the switch 100 and immediately break the connection between the wires 114 and 115 to break the circuit to the fast circuit side of the electric motor 112 and also immediately connect the main lead wire 62' with the wire 105. As soon as the connection between the wire 115 and the wire 114 is broken, and the motor cut off, the knitting machine and motor starts to coast and will slow down slowly. After a little experimenting, it can be determined exactly how long it takes the machine to slow down to approximately 900 revolutions per minute or to the slow speed desired to be driven by the electric motor 112. Once this has been established, the set screw or adjustment screw 33' may be adjusted so that the time delaying apparatus will delay the starting of the motor 112 at its slow rate of speed until the machine has slowed down to the proper speed.

When the wires 62' and 105 are connected by movement of the switch 100, an electrical circuit will be completed to the connector 106, through the wire 107, coil 95, wire 108, connector 97, and lead wire 61' so that the electromagnet will attract and raise the lever 92 upwardly to the dotted line position shown in Figure 5. This will tilt the float chamber 12' upwardly to raise the compartment 15' higher than the compartment 16' and the liquid will begin to flow from the chamber 15' into the compartment 16' at a predetermined rate of speed, depending upon adjustment of the screw 33, to thus slowly lower the float 81' in the compartment 15'.

When the float 81' has been lowered sufficiently so that the magnet 80' on the lower end thereof is close enough to attract the magnet 46' on the switch actuating arm 45', the right-hand end of the arm 45' will be raised so that the switch contacts 121 and 122 are closed. When the switch contacts 122 and 121 are closed, an electrical circuit will be completed through the wire 120, contacts 121 and 122, wire 123, connector 124, wire 125, coil 126, wire 130, and connector 97 to energize the coil 126 and lower the arm 131. The contacts 133 and 134 will then be closed to complete an electrical circuit from the connector 106, through the wire 136, the slow speed circuit of the electric motor 112, wire 135, contacts 134 and 133, arm 131, wire 132 and to the connector 97.

Thus, after a predetermined time delay following the movement of the switch 100 from right to left in Figure 5, the slow speed circuit of the electric motor 112 will be energized to drive the motor at a rate of speed which substantially is the same as the speed of the knitting machine and prevents any danger of breaking gear teeth or back-lashing of the gears.

Of course, as the pattern chain 102 continues to move, the plunger 100 will move off of the lug 103 and the spring means therein will cause the switch 100 to change positions, that is, move from left to right to again immediately complete the circuit to the fast speed circuit of the electric motor 112 and break the circuit to the time delay, which in turn, breaks the circuit to the slow speed circuit of the electric motor 112. Of course, this cycle of operation may be repeated as many times as desired since each time that a lug moves away from the plunger of the switch 100, the electrical circuit will be broken to the delaying apparatus and the coil 95 so that the lever arm will drop downwardly, by gravity, and tilt the float chamber 12' to the position shown in Figure 5.

Although the time delaying apparatus has been shown being used in two particular applications, it is to be understood that the time delaying apparatus is adaptable to an unlimited number of other types of applications to energize or de-energize electrical devices and the delay may also be wired in such a manner that the delay can come either prior to or after actuation of the delay, if desired.

While electrically operable means have been shown, in the form of the solenoid plunger 55 and the lever 92, for tilting the respective chambers 12 and 12', it is to be understood that other means, such as a mechanical lever, may be employed for this purpose or the float chambers 12 and 12' may be tilted by hand if desired.

It is thus seen that there has been provided a time delaying switch, the basic portion of which includes a tiltable float chamber with a partition dividing the same to form separate compartments with a float in one of the compartments having a magnet on its lower end for actuating a switch mechanism positioned adjacent the compartment when the float reaches predetermined levels. The partition dividing the float chamber is provided with a passageway through which the liquid must pass from one compartment to another as the float chamber is tilted to position one of the compartments at a higher elevation than the other. It is apparent that the rate at which the liquid flows from one compartment into the other is determined by the effective size of the passageway communicating therebetween and various types of adjustment means may be provided in this passageway for changing the effective size of the opening.

In the drawings and specification there has been set forth a preferred embodiment of the invention and, although specific terms are employed, they are used in a generic and descriptive sense only and not for purposes of limitation, the scope of the invention being defined in the claims.

I claim:

1. A time delaying apparatus comprising a housing, a non-magnetic chamber supported for oscillation on said housing, a partition in said chamber dividing said chamber into separate compartments, a supply of liquid in each of said compartments, said partition having a passageway therein communicating with each compartment and permitting a restricted predetermined rate of flow of said liquid from one compartment to the other, electric solenoid means for selectively tilting said chamber so that liquid will flow from one compartment to the other, adjustable stop means fixed on said housing and adapted to engage opposite ends of said chamber to restrict tilting movement of said chamber, a float in one of said compartments movable in response to the level of liquid in said compartment, a permanent magnet carried by said float, and magnetically operable switch means carried by said chamber, said switch means being operable to opened and closed positions in response to the position of said float and the magnetic attraction of said magnet to said switch means.

2. A time delaying apparatus comprising a housing, a non-magnetic chamber supported for oscillation on said housing, a partition in said chamber dividing said chamber into separate compartments, a supply of liquid in each of said compartments, said partition having a passageway therein communicating with each compartment and permitting flow of said liquid from one compartment to the other, adjustment means for varying the effective size of the passageway to control the rate of flow of said liquid, electric solenoid means for selectively tilting said chamber so that liquid will flow from one compartment to the other, adjustable stop means fixed on said housing and adapted to engage opposite ends of said chamber to restrict tilting movement of said chamber, a float in one of said compartments movable in response to the level of liquid in said compartment, a permanent magnet carried by said float, and magnetically operable switch means carried by said chamber, said switch means being operable to opened and closed positions in response to the position of said float and the magnetic attraction of said magnet to said switch means.

3. A time delaying apparatus comprising a housing, a non-magnetic chamber supported for oscillation on said housing, a partition in said chamber dividing said chamber into separate compartments, a supply of liquid in each of said compartments, said partition having a passageway therein communicating with each compartment and permitting flow of said liquid from one compartment to the other, adjustment means for varying the effective size of the passageway to control the rate of flow of said liquid, electric solenoid means for selectively tilting said chamber so that liquid will flow from one compartment to the other, adjustable stop means fixed on said housing and adapted to engage opposite ends of said chamber to restrict tilting movement of said chamber, a float in one of said compartments movable in response to the level of liquid in said compartment, means to maintain the major portion of said float out of engagement with said compartment, a permanent magnet carried by said float, and magnetically operable switch means carried by said chamber, said switch means being operable to opened and closed positions in response to the position of said float and the magnetic attraction of said magnet to said switch means, said solenoid means being correspondingly operative by said switch means.

4. A time delaying apparatus comprising a tiltable chamber, a partition in said chamber dividing said chamber into separate compartments, a supply of liquid in each of said compartments, a float in one of said compartments movable in response to the level of liquid in said compartment, a switch actuating lever oscillatably mounted beneath said chamber, said switch lever being operable upon predetermined movement of said float, electrical switch means operatively connected to said lever, means for selectively tilting said chamber so that either of said compartments is positioned higher than the other compartment, and said partition having liquid passage means communicating with each compartment to permit a restricted predetermined rate of flow of said liquid from the high compartment to the other compartment upon tilting said chamber to thereby provide a time delay during the changing of the liquid level in said one compartment.

5. A time delaying apparatus comprising a tiltable chamber, a partition in said chamber dividing said chamber into separate compartments, a supply of liquid in each of said compartments, a float in one of said compartments movable in response to the level of liquid in said compartment, a switch actuating lever oscillatably mounted at one end beneath said chamber, the other end of said lever positioned beneath said one compartment, electrical switch means mounted intermediate the ends of said lever, said switch lever being operable upon predetermined movement of said float, means for selectively tilting said chamber so that either of said compartments is positioned higher than the other compartment, and said partition having liquid passage means communicating with each compartment to permit a restricted predetermined rate of flow of said liquid from the high compartment to the other compartment upon tilting said chamber to thereby provide a time delay during the changing of the liquid level in said one compartment.

6. A time delaying apparatus comprising a tiltable chamber, a partition in said chamber dividing said chamber into separate compartments, a supply of liquid in each of said compartments, a float in one of said compartments movable in response to the level of liquid in said compartment, a switch actuating lever oscillatably mounted intermediate its ends beneath said chamber, one end of said lever positioned beneath said compartment and movable in response to predetermined movement of said float, electrical switch means operatively connected to the other end of said lever, electrical solenoid means controlled by said electrical switch means for selectively tilting said chamber so that either of said compartments is positioned higher than the other compartment, said partition having liquid passage means communicating with each compartment to permit a restricted predetermined rate of flow of said liquid from the high compartment to the other compartment upon tilting said chamber to thereby provide a time delay during the changing of the liquid level in said one compartment.

References Cited in the file of this patent

UNITED STATES PATENTS

| | | |
|---|---|---|
| 972,516 | DeWolf | Oct. 11, 1910 |
| 2,209,253 | Strungart | July 23, 1940 |
| 2,590,680 | Campbell | Mar. 25, 1952 |
| 2,711,454 | Opuszenski | June 21, 1955 |
| 2,772,331 | Carothers | Nov. 27, 1956 |
| 2,775,205 | Gunther | Dec. 25, 1956 |

FOREIGN PATENTS

| | | |
|---|---|---|
| 15,496 | Great Britain | Jan. 17, 1907 |
| 124,041 | Great Britain | Mar. 12, 1919 |
| 346,811 | France | Oct. 5, 1904 |
| 476,114 | Great Britain | Dec. 2, 1937 |